US012529391B1

United States Patent
Hu et al.

(12) United States Patent
(10) Patent No.: US 12,529,391 B1
(45) Date of Patent: Jan. 20, 2026

(54) ENERGY RECOVERY SYSTEM AND CONTROL STRATEGY FOR HYDRAULIC EXCAVATOR BOOM

(71) Applicant: Central South University of Forestry and Technology, Changsha (CN)

(72) Inventors: Peng Hu, Changsha (CN); Tao Wen, Changsha (CN); Hui Chen, Changsha (CN); Kai Liao, Changsha (CN)

(73) Assignee: Central South University of Forestry and Technology, Changsha (CN)

( * ) Notice: Subject to any disclaimer, the term of this patent is extended or adjusted under 35 U.S.C. 154(b) by 0 days.

(21) Appl. No.: 18/988,992

(22) Filed: Dec. 20, 2024

(30) Foreign Application Priority Data

Aug. 15, 2024 (CN) ......................... 202411123939.7

(51) Int. Cl.
*F15B 21/14* (2006.01)
*E02F 9/22* (2006.01)
(Continued)

(52) U.S. Cl.
CPC ............ *F15B 21/14* (2013.01); *E02F 9/2217* (2013.01); *F15B 21/08* (2013.01); *E02F 9/2296* (2013.01); *F15B 11/048* (2013.01); *F15B 2211/3056* (2013.01); *F15B 2211/3059* (2013.01); *F15B 2211/36* (2013.01); *F15B 2211/40515* (2013.01); *F15B 2211/6306* (2013.01); *F15B 2211/6313* (2013.01); *F15B 2211/665* (2013.01); *F15B 2211/7107* (2013.01);
(Continued)

(58) Field of Classification Search
CPC ........ F15B 21/08; F15B 21/14; F15B 11/048; F15B 2211/3056; F15B 2211/3059; F15B 2211/36; F15B 2211/40515; F15B 2211/6306; F15B 2211/6313; F15B 2211/665; F15B 2211/7107; F15B 2211/7128; F15B 2211/761; F15B 2211/88; E02F 9/2217; E02F 9/2296
See application file for complete search history.

(56) References Cited

U.S. PATENT DOCUMENTS 7,596,893 B2 * 10/2009 Tozawa ................. E02F 9/2292 37/348
7,905,088 B2 * 3/2011 Stephenson ........... E02F 9/2217 60/417
(Continued)

*Primary Examiner* — Dustin T Nguyen
(74) *Attorney, Agent, or Firm* — Addison D. Ault; IPGentleman Intellectual Property Services, LLC

(57) ABSTRACT

An energy recovery system and control strategy for a hydraulic excavator boom is provided. The energy recovery system includes an oil tank, an accumulator, and a first energy recovery cylinder, an energy utilization cylinder, and a second energy recovery cylinder that are sequentially arranged below a boom and connected to the boom, the first energy recovery cylinder, the energy utilization cylinder, and the second energy recovery cylinder are connected to the oil tank and the accumulator through an oil conveying system, the oil conveying system includes a rod cylinder oil inlet and outlet pipe system, a rodless cylinder oil inlet pipe system of the energy recovery cylinder, a rodless cylinder oil inlet pipe system of the energy utilization cylinder, a rodless cylinder oil return pipe system of the energy utilization cylinder, and a rodless cylinder oil return pipe system of the energy recovery cylinder.

2 Claims, 4 Drawing Sheets

(51) Int. Cl.
*F15B 21/08* (2006.01)
*F15B 11/048* (2006.01)

(52) U.S. Cl.
CPC . *F15B 2211/7128* (2013.01); *F15B 2211/761* (2013.01); *F15B 2211/88* (2013.01)

(56) References Cited

U.S. PATENT DOCUMENTS

| | | | | |
|---|---|---|---|---|
| 9,279,236 | B2 * | 3/2016 | Zhang | E02F 9/2292 |
| 9,702,118 | B2 * | 7/2017 | Gorman | E02F 3/32 |
| 2010/0089049 | A1 * | 4/2010 | Matsuura | E02F 9/2296<br>60/419 |
| 2013/0333378 | A1 * | 12/2013 | Wen | F15B 21/14<br>60/327 |
| 2013/0340418 | A1 * | 12/2013 | Wen | F15B 1/033<br>91/5 |
| 2014/0325972 | A1 * | 11/2014 | Ma | F15B 21/14<br>60/413 |
| 2016/0312443 | A1 * | 10/2016 | Egawa | E02F 9/2217 |

* cited by examiner

ENERGY RECOVERY SYSTEM AND CONTROL STRATEGY FOR HYDRAULIC EXCAVATOR BOOM

CROSS-REFERENCE TO THE RELATED APPLICATIONS

This application is based upon and claims priority to Chinese Patent Application No. 202411123939.7, filed on Aug. 15, 2024, the entire contents of which are incorporated herein by reference.

TECHNICAL FIELD

The present invention relates to the field of hydraulic excavator boom energy recovery technology, particularly an energy recovery system and control strategy for a hydraulic excavator boom.

BACKGROUND

The hydraulic excavator boom energy recovery system in the existing technology is shown in FIG. 2, when the boom moves down, the oil in the rodless cavity of the energy recovery cylinder is input and stored in the accumulator to realize the potential energy recovery of the boom; during the lifting process of the boom, the hydraulic oil stored in the accumulator is output into the rodless cavity of the energy utilization cylinder to realize the reuse of the recovered energy. This structure can use the accumulator to supply the oil for the energy utilization cylinder to realize the function of balancing the weight of the working device and reducing the load of the main pump during the lifting process of the boom. However, there are the following problems in use: in the load condition of the hydraulic excavator boom moving down, theoretically, the boom oil cylinder outlet only needs a small throttling back pressure to achieve the speed control of the boom moving down, but in the existing single valve spool four-sided slide valve control mode, the outlet state can only follow the inlet state to carry out the linkage, which increases the throttling loss. In addition, the energy recovery system adopts the conventional main valve spool linkage control, so in the process of boom moving down, the hydraulic oil output by the energy utilization cylinder returns to the oil tank through the boom main valve, which is bound to produce a large oil return back pressure at the front end of the boom main valve, and the pressure and the back pressure of the accumulator will produce a larger oil return back pressure, therefore it is necessary to further improve the output pressure of the main pump to maintain the maneuverability of the whole machine, which will affect the maneuverability to a certain extent and reduce the energy recovery effect.

In order to solve the above problems, it is necessary to provide a new type of energy recovery system for the hydraulic excavator boom.

SUMMARY

An objective of the present invention is to provide an energy recovery system and a control strategy for a hydraulic excavator boom, to reduce the oil return back pressure and throttling loss, maintain the maneuverability of a whole machine, and improve energy recovery efficiency.

In order to achieve the above objective, the present invention provides an energy recovery system for a hydraulic excavator boom, including an oil tank, an accumulator, and a first energy recovery cylinder, an energy utilization cylinder, and a second energy recovery cylinder that are sequentially arranged below a boom and connected to the boom, the first energy recovery cylinder, the energy utilization cylinder, and the second energy recovery cylinder are connected to the oil tank and the accumulator through an oil conveying system, the oil conveying system includes a rod cylinder oil inlet and outlet pipe system, a rodless cylinder oil inlet pipe system of the energy recovery cylinder, a rodless cylinder oil inlet pipe system of the energy utilization cylinder, a rodless cylinder oil return pipe system of the energy utilization cylinder, and a rodless cylinder oil return pipe system of the energy recovery cylinder.

Preferably, the rod cylinder oil inlet and outlet pipe system includes a rod cavity oil pipe, one end of the rod cavity oil pipe is connected to the first energy recovery cylinder, the energy utilization cylinder and a rod cavity oil port at a top of the second energy recovery cylinder through three first branches, another end of the rod cavity oil pipe is connected to a first oil hole on a boom main valve, a second oil hole on the boom main valve is connected to an oil outlet hole of the oil tank through a main pump, a third oil hole of the boom main valve is connected to an oil return hole of the oil tank.

Preferably, the rodless cylinder oil inlet pipe system of the energy recovery cylinder includes a rodless cavity oil pipe of the energy recovery cylinder and an energy recovery cylinder oil inlet pipe, one end of the rodless cavity oil pipe of the energy recovery cylinder is connected to the first energy recovery cylinder and the rodless cavity oil port of the second energy recovery cylinder through two second branches, another end of the rodless cavity oil pipe of the energy recovery cylinder is connected to a first oil port on an energy control valve, and a second oil port of the energy control valve is connected to a fourth oil hole of the boom main valve through the energy recovery cylinder oil inlet pipe;

when a right position of the boom main valve is opened, the first oil hole and the second oil hole are connected, the third oil hole and the fourth oil hole are connected, and oil supplied by the main pump promotes the boom to move down; when a left position of the boom main valve is opened, the second oil hole and the fourth oil hole are connected, and the first oil hole and the third oil hole are connected, oil supplied by the main pump promotes the boom to rise.

Preferably, the rodless cylinder oil inlet pipe system of the energy utilization cylinder includes a rodless cavity oil pipe of the energy utilization cylinder, an energy utilization cylinder oil inlet pipe and an accumulator oil pipe, one end of the rodless cavity oil pipe of the energy utilization cylinder is connected to a rodless cavity oil port of the energy utilization cylinder, another end of the rodless cavity oil pipe of the energy utilization cylinder is connected to a third oil port of the energy control valve through the energy utilization cylinder oil inlet pipe, and a fourth oil port of the energy control valve is connected to the accumulator through the accumulator oil pipe;

when a right position of the energy control valve is opened, the first oil port and the fourth oil port on the energy control valve are connected, and the third oil port and the second oil port are not connected; when a left position of the energy control valve is opened, the first oil port and the second oil port on the energy control valve are connected, and the third oil port and the fourth oil port are connected.

Preferably, the rodless cylinder oil return pipe system of the energy utilization cylinder includes a rodless cavity oil pipe of the energy utilization cylinder and an energy utilization cylinder oil return pipe, one end of the rodless cavity oil pipe of the energy utilization cylinder is connected to a rodless cavity oil port of the energy utilization cylinder, and another end of the rodless cavity oil pipe of the energy utilization cylinder is connected to the oil tank through the energy utilization cylinder oil return pipe, and the energy utilization cylinder oil return pipe is provided with a throttling speed regulating valve.

Preferably, a rodless cylinder oil return pipe system of the energy recovery cylinder includes a rodless cavity oil pipe of the energy recovery cylinder and the accumulator oil pipe.

Preferably, a first anti-overflow oil pipe with a first anti-overflow valve is arranged between the rod cavity oil pipe and the oil tank, and a second anti-overflow oil pipe with a second anti-overflow valve is arranged between the energy recovery cylinder oil inlet pipe and the oil tank.

An energy recovery control strategy for the hydraulic excavator boom: when the boom moves down, the boom main valve keeps a maximum opening degree according to a signal value of a pilot pressure of an operating handle, and changes the opening degree of the throttling speed regulating valve through a pressure adaptive energy recovery control strategy based on a load observation, so as to realize a control of a descending velocity of the boom and an output flow of the main pump, the specific methods include the following steps:

step 1: using a sensor to detect a required signal value and sending the required signal value to a controller, wherein the signal value includes a boom movement velocity $v_a$ collected by using a speed sensor, a pilot pressure $P_{a1}$ of the operating handle when the boom moves down collected by using a first pressure sensor, a target pressure $P_{da}$ of the rod cavity collected by using a second pressure sensor, an actual load pressure $P_{D2}$ of the rodless cavity of the energy utilization cylinder collected by using a third pressure sensor, a load pressure $P_{pa}$ of an output port of the main pump collected by using a fourth pressure sensor, and the controller includes a load observer module, a speed regulating valve target pressure solving module and a valve spool opening solving module;

step 2: calculating an equivalent load term $a_L$ by using the load observer module, the calculation method is as follows:

$$\begin{cases} a_L = F_L - F_{acc} \\ F_L = m\dot{v}_a - A_{D2}p_{D2} \\ F_{acc} = 2A_{D1}p_{acc} \end{cases}$$

where $a_L$ is the equivalent load term, $F_L$ is an external load, $F_{acc}$ is an accumulator acting force, $A_{D2}$ denotes a rodless cavity area of the energy utilization cylinder, $A_{D1}$ denotes a rodless cavity area of the first energy recovery cylinder or the second energy recovery cylinder, and $P_{acc}$ is a pressure at the accumulator port;

step 3: calculating a target pressure $P_{D2a}$ of the throttling speed regulating valve by using the speed regulating valve target pressure solving module:

$$p_{D2a} = \frac{3A_d p_{da} - m\dot{v}_a - bv_a - ma_L}{A_{D2}}$$

where $A_d$ denotes a sum of the rod cavity area of the first energy recovery cylinder, the second energy recovery cylinder and the energy utilization cylinder; $P_{da}$ is a target pressure of the rod cavity measured in step 1; m denotes an equivalent mass of a working device acting on the oil cylinder; $v_a$ is a velocity of the boom movement measured in step 1; $\dot{v}_a$ denotes an accelerated velocity, which is obtained by differentiating $v_a$; b denotes a viscosity coefficient; $a_L$ is the equivalent load term calculated in step 2; $A_{D2}$ denotes a rodless cavity area of energy utilization cylinder;

step 4: comparing the target pressure $P_{D2a}$ of the throttling speed regulating valve obtained in step 3 with the actual load pressure $P_{D2}$ of the rodless cavity of the energy utilization cylinder measured in step 1, if $P_{D2a}$ is equal to $P_{D2}$, the opening of the throttling speed regulating valve will not be changed, if $P_{D2a}$ is not equal to $P_{D2}$, the carrying out the next step 5;

step 5: when a pressure difference between $P_{D2a}$ and $P_{D2}$ is positive, reducing the opening of the throttling speed regulating valve, increasing a throttle pressure difference, reducing an output flow of the main pump to reduce a descending velocity of the boom; when the pressure difference between $P_{D2a}$ and $P_{D2}$ is negative, increasing the opening of the throttling speed regulating valve, reducing the throttling pressure difference, increasing the output flow of the main pump to increase the descending velocity of the boom;

in the control process, calculating a valve spool opening area $A_{Dx}$ of flow regulating speed regulating valve according to the following formula:

$$A_{Dx} = \frac{Q_{D2a}}{C_{dD}} / \sqrt{\frac{2p_{D2}}{\rho}}$$

$$Q_{D2a} = k_{VC}(P_{a1} - \zeta)A_{D2}$$

where $C_{dD}$ is a flow coefficient of a proportional speed regulating valve spool, p is a density of hydraulic oil, $P_{D2}$ is the actual load pressure of the rodless cavity of the energy utilization cylinder measured in step 1, $Q_{D2a}$ is a target flow of the throttling speed regulating valve, $k_{VC}$ is a proportional constant of a boom target velocity and the pilot pressure of the operating handle, ζ is an error threshold of the pilot pressure signal of the operating handle;

during the control process, the main pump is in a constant power control mode, after the opening of the throttling speed regulating valve changes, the boom movement velocity $v_a$ collected by the speed sensor changes, and the controller controls the change of the output flow of the main pump until the load pressure $P_{pa}$ of the output port of the main pump collected by the fourth pressure sensor reaches the target value, a calculation method of a target value of $P_{pa}$ is as follows:

$$p_{pa} = \begin{cases} \left(1.16 - \frac{Q_{pa}}{n_t V_{max}}\right)/0.0195 & 120.9 \le Q_{pa} < 157 \\ \left(1.97 - \frac{Q_{pa}}{n_t V_{max}}\right)/0.051 & 157 \le Q_{pa} < 258.8 \\ \left(1 - \frac{Q_{pa}}{n_t V_{max}}\right)/0.0019 & 258.8 \le Q_{pa} < 269 \end{cases}$$

where $P_{pa}$ is a load pressure of the output port of the main pump; $V_{max}$ is a rated maximum displacement of the main pump; $n_r$, is a rotating speed of an engine, $Q_{pa}$ is an oil inlet target flow of three rodless cavity oil ports, a calculation method for $Q_{pa}$ is as follows:

$$Q_{pa}=K_{VC}(P_{a1}-\zeta)3A_d$$

where $k_{VC}$ is a proportional constant of a boom descending target velocity and a pilot control pressure, $P_{a1}$ is a pilot pressure of the operating handle when the boom moves down, $\zeta$ is the error threshold of the pilot pressure signal of the operating handle, $A_d$ denotes the sum of the rod cavity area of the first energy recovery cylinder, the second energy recovery cylinder and the energy utilization cylinder.

The energy recovery control strategy for the hydraulic excavator boom: when the boom rises, the opening of the proportional pressure reducing valve is changed by an energy reuse control strategy based on a flow following, the specific method includes the following steps:

step 1: calculating a target flow of the oil inlet: arranging a proportional pressure reducing valve on an oil circuit control between the operating handle and the boom main valve, and connecting the proportional pressure reducing valve to the controller, arranging an oil inlet target flow calculation module, a rodless cavity target pressure solving module and a proportional pressure reducing valve control signal solving module on the controller, using the first pressure sensor to collect the pilot pressure $P_{b1}$ of the operating handle when the boom rises, and inputting $P_{b1}$ into the oil inlet target flow calculation module to obtain an oil inlet target flow $Q_{pb}$, then transmitting $Q_{pb}$ to the proportional pressure reducing valve control signal solving module, the calculation method of $Q_{pb}$ is as follows:

$$Q_{pb}=K_{VC}(P_{b1}-\zeta)2A_{D1}$$

where $k_{VC}$ is the proportional constant of the boom target velocity and the pilot pressure of the operating handle, $\zeta$ is the error threshold of the pilot pressure signal of the operating handle, $A_{D1}$ denotes the rodless cavity area of the first energy recovery cylinder or the second energy recovery cylinder;

step 2: judging whether to adjust the proportional pressure reducing valve: using a sixth pressure sensor to collect the actual pressure $P_{D1}$ of the rodless cavity of the energy recovery cylinder at the rodless cavity oil pipe of the energy recovery cylinder, using a seventh pressure sensor to collect the load pressure $P_p$ of the output port of the main pump, receiving $P_{D1}$, $P_p$ and $Q_{pb}$ output by the oil inlet target flow calculation module in step 1 through the rodless cavity target pressure solving module, and using the following method to calculate an oil inlet target flow $P_{D1a}$ of the rodless cavity of the energy recovery cylinder:

$$p_{D1a}=p_p-\frac{Q_{pb}^2}{2(C_{dA}A_x)^2}$$

where $C_{dA}$ is a flow coefficient of the main valve spool of the boom, $A_x$ is an opening area of the main valve spool of the boom under the control of the proportional pressure reducing valve;

comparing $P_{D1}$ with $P_{D1a}$, if $P_{D1}$ is equal to $P_{D1a}$, the judgment result is 'do not adjust the proportional pressure reducing valve', if $P_{D1}$ is not equal to Ppla, the judgment result is 'adjust the proportional pressure reducing valve', transporting the judgment result to the proportional pressure reducing valve control signal solving module by the oil inlet target flow calculation module;

step 3: solving a control signal of the proportional pressure reducing valve: when the judgment result received by the proportional pressure reducing valve control signal solving module is 'do not adjust the proportional pressure reducing valve', the proportional pressure reducing valve control signal solving module has no signal output, and does not change the output of the proportional pressure reducing valve, so will not lead to a displacement of the spool of the boom main value, so as to avoid the increase of the throttling loss of the valve port of the boom main value, outputting the flow of the main pump by the system according to a current constant power control mode; when the judgment result received by the proportional pressure reducing valve control signal solving module is 'adjust the proportional pressure reducing valve', solving the control signal $j_x$ of the proportional pressure reducing valve by the proportional pressure reducing valve control signal solving module using a received $Q_{pb}$ and a negative flow feedback pressure p; of the boom main valve detected by a fifth pressure sensor, the controller controls the output of the proportional pressure reducing valve to decrease or increase according to $j_x$, when the output of the proportional pressure reducing valve decreases, the displacement of the spool of the boom main value decreases and the flow of the boom main valve increases, resulting in the increase of the negative flow feedback pressure $p_i$ of the boom main valve detected by the fifth pressure sensor, when the output of the proportional pressure reducing valve increases, the displacement of the spool of the boom main value increases and the flow of the boom main valve decreases, resulting in the decrease of the negative flow feedback pressure $p_i$ of the boom main valve detected by the fifth pressure sensor, adjusting the output flow of the main pump by the the system according to the negative flow feedback pressure of the boom main valve until the output flow of the main pump and the negative flow feedback pressure $p_i$ of the boom main valve form a balance, where a calculation method of $j_x$ is:

$$j_x=f_i^{-1}(Q_{pb})/P_i$$

where, $f_i^{-1}(x)$ is a fitting function of a mapping relationship between the negative flow signal of the main pump and the output flow of the main pump.

Therefore, the present invention adopts the energy recovery system and control strategy for the hydraulic excavator boom with the above structure, and has the following beneficial effects:

1. the inlet and outlet oil can be controlled by two sets of valve spools respectively can be realized by using the rod cylinder oil inlet and outlet pipe system, the rodless cylinder oil inlet pipe system of energy recovery cylinder, the rodless cylinder oil inlet pipe system of energy utilization cylinder, the rodless cylinder oil return pipe system of energy utilization cylinder and the rodless cylinder oil return pipe system of energy recovery cylinder, and the position of each valve spool can be adjusted according to the system state to realize the control of the boom movement, meanwhile, the back pressure and throttling loss of the return oil are reduced, the energy output of the main pump is reduced, the maneuverability of the whole machine is maintained, and the energy recovery efficiency is improved;

2. the pressure adaptive energy recovery control strategy based on an independent inlet and outlet is used to change the opening of the throttling speed regulating valve, so as to realize the control of the descending velocity of the boom and the output flow of the main pump, and effectively reduce the oil inlet throttling loss of the boom main valve;
3. the energy reuse control strategy based on flow following is used to control the opening of the proportional pressure reducing valve, so as to realize the active control of the spool opening of the boom main valve and the negative flow feedback pressure of the boom main valve, so as to change the output flow of the main pump and maintain the maneuverability of the whole machine.

Further detailed descriptions of the technical scheme of the present invention can be found in the accompanying drawings and embodiments.

REFERENCE NUMERALS IN FIGS

1, an oil tank; 2, an accumulator; 3, a boom; 4, a first energy recovery cylinder; 5, an energy utilization cylinder; 6, a second energy recovery cylinder; 7, a rod cavity oil pipe; 8, a first branch; 9, a boom main valve; 10, a rodless cavity oil pipe of the energy recovery cylinder; 11, an energy recovery cylinder oil inlet pipe; 12, a second branch; 13, an energy control valve; 14, a rodless cavity oil pipe of the energy utilization cylinder; 15, an energy utilization cylinder oil inlet pipe; 16, an accumulator oil pipe; 17, a cartridge valve; 18, a pressure control valve; 19, an energy utilization cylinder oil return pipe; 20, a throttling speed regulating valve; 21, a first anti-overflow valve; 22, a first anti-overflow oil pipe; 23, a second anti-overflow valve; 24, a second anti-overflow oil pipe; 25, a main pump; 26, a speed sensor; 27, a first pressure sensor; 28, a second pressure sensor; 29, a third pressure sensor; 30, a fourth pressure sensor; 31, an oil circuit control; 32, a proportional pressure reducing valve; 33, a fifth pressure sensor; 34, a sixth pressure sensor; 35, a seventh pressure sensor.

DETAILED DESCRIPTION OF THE EMBODIMENTS

The technical scheme of the present invention is further explained below by drawings and embodiments.

EMBODIMENT

Figure 1:
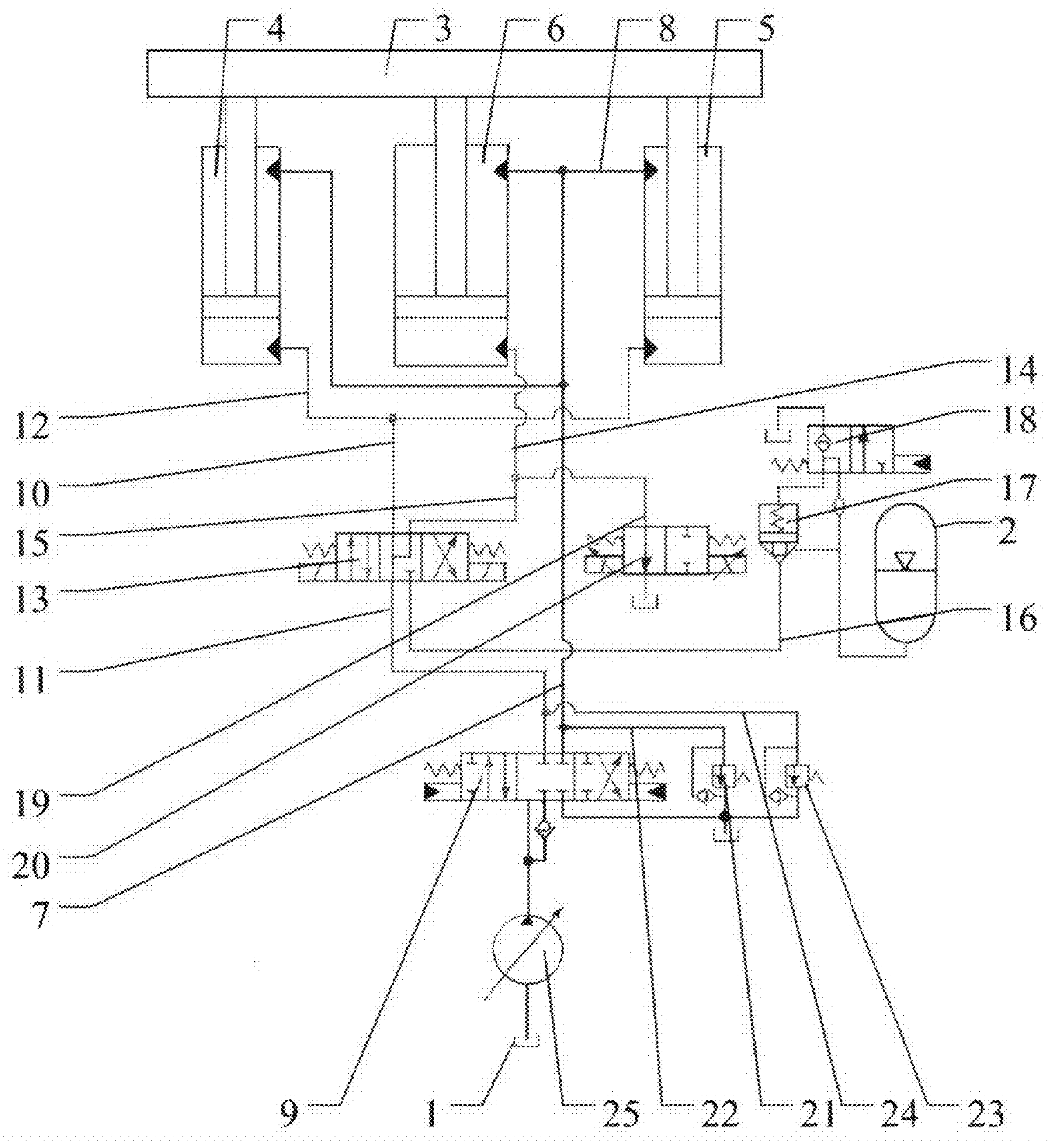
FIG. 1 is a schematic diagram of an embodiment of an energy recovery system for a hydraulic excavator boom.
Figure 2:
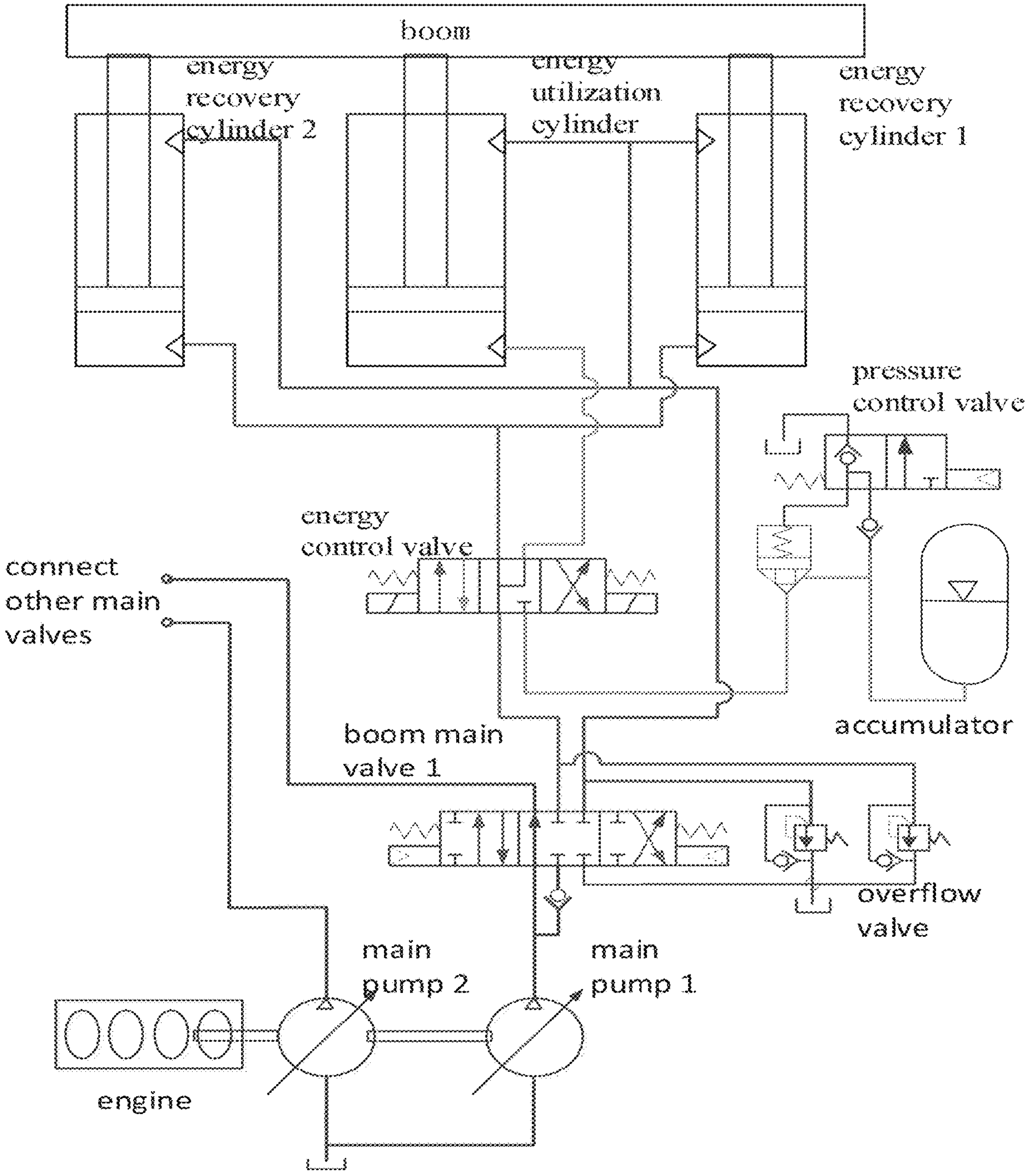
FIG. 2 (Prior Art)
FIG. 2 is an energy recovery system for a hydraulic excavator boom in the existing technology.

As shown in FIG. 1, an energy recovery system for a hydraulic excavator boom, including an oil tank 1, an accumulator 2, and a first energy recovery cylinder 4, an energy utilization cylinder 5, and a second energy recovery cylinder 6 that are sequentially arranged below a boom 3 and connected to the boom 3, the first energy recovery cylinder 4, the energy utilization cylinder 5, and the second energy recovery cylinder 6 are connected to the oil tank 1 and the accumulator 2 through an oil conveying system, the oil conveying system includes a rod cylinder oil inlet and outlet pipe system, a rodless cylinder oil inlet pipe system of the energy recovery cylinder, a rodless cylinder oil inlet pipe system of the energy utilization cylinder 5, a rodless cylinder oil return pipe system of the energy utilization cylinder 5, and a rodless cylinder oil return pipe system of the energy recovery cylinder.

The rod cylinder oil inlet and outlet pipe system includes a rod cavity oil pipe 7, one end of the rod cavity oil pipe 7 is connected to the first energy recovery cylinder 4, the energy utilization cylinder 5 and a rod cavity oil port at a top of the second energy recovery cylinder 6 through three first branches 8, another end of the rod cavity oil pipe 7 is connected to a first oil hole on a boom main valve 9, a second oil hole on the boom main valve 9 is connected to an oil outlet hole of the oil tank 1 through a main pump 25, a third oil hole of the boom main valve 9 is connected to an oil return hole of the oil tank 1.

The rodless cylinder oil inlet pipe system of the energy recovery cylinder includes a rodless cavity oil pipe of the energy recovery cylinder 10 and an energy recovery cylinder oil inlet pipe 11, one end of the rodless cavity oil pipe of the energy recovery cylinder 10 is connected to the first energy recovery cylinder 4 and the rodless cavity oil port of the second energy recovery cylinder 6 through two second branches 12, another end of the rodless cavity oil pipe of the energy recovery cylinder 10 is connected to a first oil port on an energy control valve 13, and a second oil port of the energy control valve 13 is connected to a fourth oil hole of the boom main valve 9 through the energy recovery cylinder oil inlet pipe 11;

when a right position of the boom main valve 9 is opened, the first oil hole and the second oil hole are connected, the third oil hole and the fourth oil hole are connected, and oil supplied by the main pump 25 promotes the boom 3 to drop; when a left position of the boom main valve 9 is opened, the second oil hole and the fourth oil hole are connected, and the first oil hole and the third oil hole are connected, oil supplied by the main pump 25 promotes the boom 3 to rise.

The rodless cylinder oil inlet pipe system of the energy utilization cylinder 5 includes a rodless cavity oil pipe of the energy utilization cylinder 14, an energy utilization cylinder oil inlet pipe 15 and an accumulator oil pipe 16, one end of the rodless cavity oil pipe of the energy utilization cylinder 14 is connected to a rodless cavity oil port of the energy utilization cylinder 5, another end of the rodless cavity oil pipe of the energy utilization cylinder 14 is connected to the third oil port of the energy control valve 13 through the energy utilization cylinder oil inlet pipe 15, and the fourth oil port of the energy control valve 13 is connected to the accumulator 2 through the accumulator oil pipe 16.

When a right position of the energy control valve 13 is opened, the first oil port and the fourth oil port on the energy control valve 13 are connected, and the third oil port and the second oil port are not connected; when a left position of the energy control valve 13 is opened, the first oil port and the second oil port on the energy control valve 13 are connected, and the third oil port and the fourth oil port are connected. During use, when the energy control valve 13 is in the right position, the oil in the rodless cavity of the first energy recovery cylinder 4 and the second energy recovery cylinder 6 can enter the accumulator 2 through the energy control valve 13 and the accumulator oil pipe 16; when the energy control valve 13 is in the left position, the oil in the accumulator 2 can enter the energy utilization cylinder 5 through the energy control valve 13, and the oil in the energy recovery cylinder 11 can enter the rodless cavity of the first energy recovery cylinder 4 and the second energy recovery cylinder 6 through the energy control valve 13, prompting the boom 3 to rise.

The accumulator oil pipe 16 is provided with a cartridge valve 17, the accumulator oil pipe 16 includes a front section connected to the energy control valve 13 and a rear section connected to the accumulator 2, the A port of the cartridge valve 17 is connected to the front end, the B port of the cartridge valve 17 is connected to the rear section, the X port of the cartridge valve 17 is connected to the oil tank 1 through a pressure control valve 18, the left position of the pressure control valve 18 is the first one-way valve, the flow direction of the first one-way valve is from the fuel tank 1 to the X port, the right position of the pressure control valve 18 is a blocking valve, the pressure control valve 18 is connected to the rear section through a control oil pipe of the second one-way valve, the flow direction of the second one-way valve is from the second oil pipe to the pressure control valve 18. The combination of the cartridge valve 17 and the pressure control valve 18 enables the oil in the accumulator 2 to enter and flow smoothly.

The rodless cylinder oil return pipe system of the energy utilization cylinder 5 includes a rodless cavity oil pipe of the energy utilization cylinder 14 and an energy utilization cylinder oil return pipe 19, one end of the rodless cavity oil pipe of the energy utilization cylinder 14 is connected to a rodless cavity oil port of the energy utilization cylinder 5, and another end of the rodless cavity oil pipe of the energy utilization cylinder 14 is connected to the oil tank 1 through the energy utilization cylinder oil return pipe 19, and the energy utilization cylinder oil return pipe 19 is provided with a throttling speed regulating valve 20.

A rodless cylinder oil return pipe system of the energy recovery cylinder includes a rodless cavity oil pipe of the energy recovery cylinder 10 and the accumulator oil pipe 16. The rodless cylinder oil return pipe system of the energy recovery cylinder can make the boom 3 drop and the energy control valve 13 is in the right position, and the oil in the first energy recovery cylinder 4 and the second energy recovery cylinder 6 can return to the accumulator 2.

A first anti-overflow oil pipe 22 with a first anti-overflow valve 21 is arranged between the rod cavity oil pipe 7 and the oil tank 1, the first anti-overflow oil pipe 22 can prevent the boom 3 from stalling when the boom 3 moves down, the oil transported by the main pump 25 will flow back to the oil tank 1 through the first anti-overflow valve 21 and will not continue to send oil to the energy utilization cylinder 5, the first energy recovery cylinder 4 and the second energy recovery cylinder 6, then cylinder will be damaged. A second anti-overflow oil pipe 24 with a second anti-overflow valve 23 is arranged between the energy recovery cylinder oil inlet pipe 11 and the oil tank 1, the second anti-overflow oil pipe 24 can prevent the boom 3 from stalling when the boom 3 rises, the oil transported by the main pump 25 will flow back to the oil tank 1 through the second anti-overflow valve 23 and will not continue to send oil to the first energy recovery cylinder 4 and the second energy recovery cylinder 6, then cylinder will be damaged.

When in use, when the boom 3 moves down, the boom main valve 9 and the energy control valve 13 are both in the right position with open state, and the throttling speed regulating valve 20 is in an open state; the main pump 25 enables the oil in the oil tank 1 to pass through the boom main valve 9, the rod cavity oil pipe 7 and the first branch 8 successively into the rod cavity of the first energy utilization cylinder 5, the first energy recovery cylinder 4 and the second energy recovery cylinder 6, and the oil in the rodless cavity of the first energy recovery cylinder 4 and the second energy recovery cylinder 6 successively passes through the second branch 12, the rodless cavity oil pipe of the energy recovery cylinder 10, the energy control valve 13 and the accumulator oil pipe 16 to enter the accumulator 2, and the oil in the rodless cavity of the first energy utilization cylinder 5 returns to the oil tank 1 through the first energy utilization cylinder oil return pipe 19; when the boom 3 rises, the boom main valve 9 and the energy control valve 13 are both in the left position with open state, and the throttling speed regulating valve 20 is in a closed state; the main pump 25 enables the oil in the oil tank 1 to enter the rodless cavity of the first energy recovery cylinder 4 and the second energy recovery cylinder 6 successively passes through the boom main valve 9, the energy recovery cylinder inlet oil pipe 11, the energy control valve 13, the rodless cavity oil pipe of the energy recovery cylinder 10 and the second branch 12; the oil in the accumulator 2 successively passes through the accumulator oil pipe 16, the energy control valve 13, the energy utilization cylinder oil inlet pipe 15 and the rodless cavity oil pipe of the energy utilization cylinder 14 to enter the rodless cavity of the energy utilization cylinder 5, and the oil in the rod cavity of the energy utilization cylinder 5, the first energy recovery cylinder 4 and the second energy recovery cylinder 6 returns to the oil tank 1 successively passes through the first branch 8, the rod cavity oil pipe 7 and the boom main valve 9.

Figure 3:
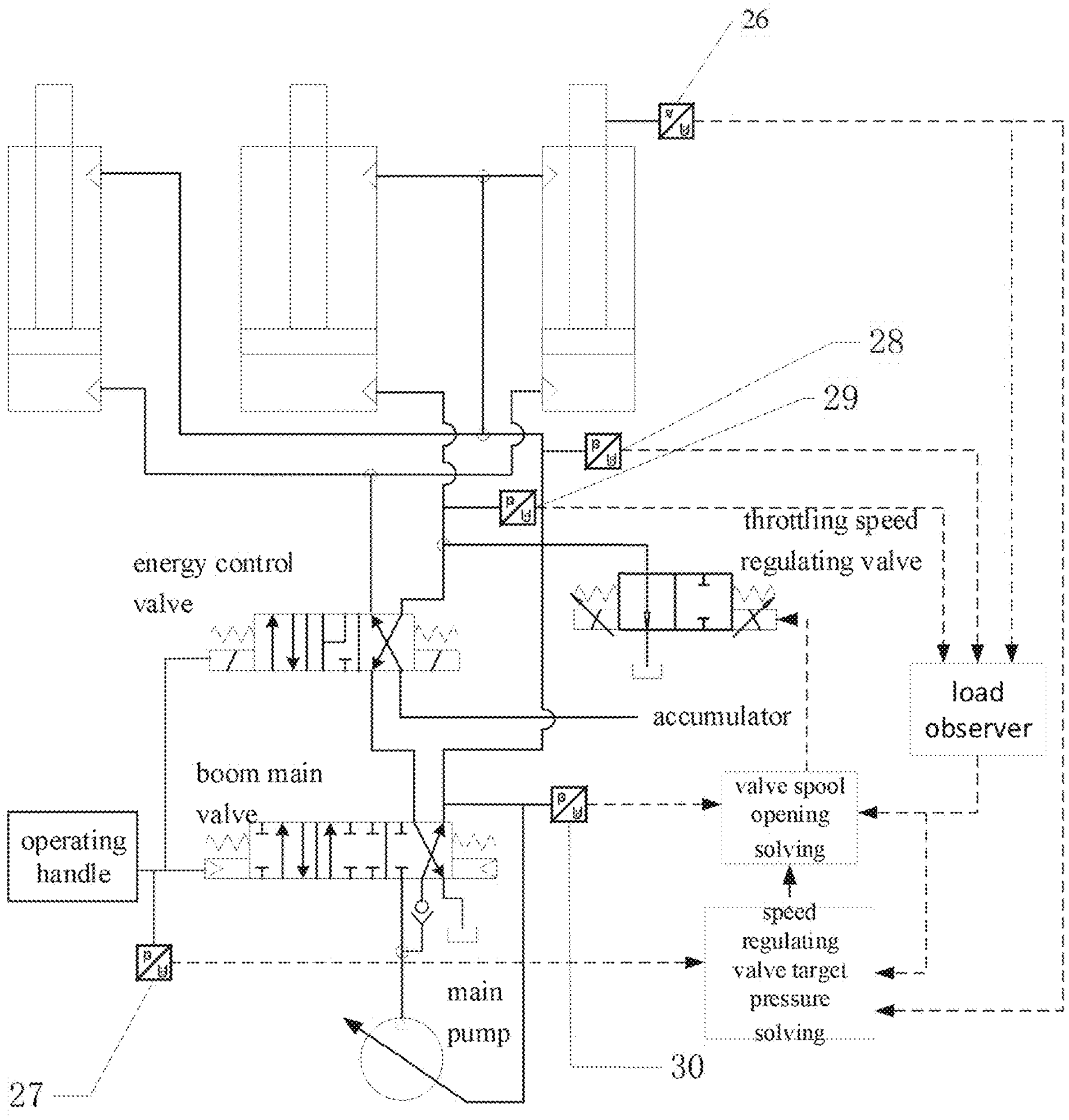
FIG. 3 is a schematic diagram of an embodiment of a pressure adaptive energy recovery control strategy based on a load observation in the present invention.

As shown in FIG. 3, an energy recovery control strategy for the hydraulic excavator boom 3: when the boom 3 moves down, the boom main valve 9 keeps a maximum opening degree according to a signal value of a pilot pressure of the operating handle, and changes the opening degree of the throttling speed regulating valve 20 through a pressure adaptive energy recovery control strategy based on a load observation, so as to realize a control of a descending velocity of the boom 3 and an output flow of the main pump 25, the specific methods include the following steps:

step 1: a sensor is used to detect a required signal value and send the required signal value to a calculating module of a controller, wherein the signal value includes a boom 3 movement speed $v_a$ collected by using a speed sensor 25, a pilot pressure $P_{a1}$ of the operating handle when the boom 3 moves down collected by using a first pressure sensor 27, a target pressure Pin of the rod cavity collected by using a second pressure sensor 28, an actual load pressure $P_{D2}$ of the rodless cavity of the energy utilization cylinder 5 collected by using a third pressure sensor 29, a load pressure $P_{pa}$ of an output port of the main pump collected by using a fourth pressure sensor 30, and the calculating module includes a load observer module, a speed regulating valve target pressure solving module and a valve spool opening solving module;

step 2: an equivalent load term $a_L$ is calculated by using the load observer module, the calculation method is as follows:

$$\begin{cases} a_L = F_L - F_{acc} \\ F_L = m\dot{v}_a - A_{D2} p_{D2} \\ F_{acc} = 2A_{D1} p_{acc} \end{cases}$$

where $a_L$ is the equivalent load term, $F_L$ is an external load, $F_{acc}$ is an accumulator 2 acting force, $A_{D2}$ denotes a rodless cavity area of the energy utilization cylinder 5, $A_{D1}$ denotes a rodless cavity area of the first energy recovery cylinder 4 or the second energy recovery cylinder, and $P_{acc}$ is a pressure at the accumulator 2 port;

step 3: a target pressure $P_{D2a}$ of the throttling speed regulating valve is calculated by using the speed regulating valve target pressure solving module:

$$p_{D2a} = \frac{3A_d p_{da} - m\dot{v}_a - bv_a - ma_L}{A_{D2}}$$

where $A_d$ denotes a sum of the rod cavity area of the first energy recovery cylinder 4, the second energy recovery cylinder 6 and the energy utilization cylinder 5; $P_{da}$ is a target pressure of the rod cavity measured in step 1; m denotes an equivalent mass of a working device acting on the oil cylinder; $v_a$ is a velocity of the boom 3 movement speed measured in step 1; $\dot{v}_a$ denotes an accelerated velocity, which is obtained by differentiating $v_a$; b denotes a viscosity coefficient; $a_L$ is the equivalent load term calculated in step 2; $A_{D2}$ denotes a rodless cavity area of energy utilization cylinder 5;

step 4: compared the target pressure $P_{D2a}$ of the throttling speed regulating valve 20 obtained in step 3 with the actual load pressure $P_{D2}$ of the rodless cavity of the energy utilization cylinder 5 measured in step 1, if $P_{D2a}$ is equal to $P_{D2}$, the opening of the throttling speed regulating valve 20 will not be changed, if $P_{D2a}$ is not equal to $P_{D2}$, the carrying out the next step 5;

step 5: when the pressure difference between $P_{D2a}$ and $P_{D2}$ is positive, the opening of the throttling speed regulating valve 20 is reduced, a throttle pressure difference is increased, an output flow of the main pump 25 is reduced to reduce a descending velocity of the boom 3; when the pressure difference between $P_{D2a}$ and $P_{D2}$ is negative, the opening of the throttling speed regulating valve 20 is increased, the throttling pressure difference is reduced, the output flow of the main pump 25 is increased to increase a descending velocity of the boom 3;

in the control process, a valve spool opening area $A_{Dx}$ of flow regulating speed regulating valve is calculated according to the following formula:

$$A_{Dx} = \frac{Q_{D2a}}{C_{dD}} / \sqrt{\frac{2p_{D2}}{\rho}}$$

$$Q_{D2a} = k_{VC}(P_{a1} - \zeta)A_{D2}$$

where $C_{dD}$ is a flow coefficient of a proportional speed regulating valve spool, p is a density of hydraulic oil, $P_{D2}$ is the actual load pressure of the rodless cavity of the energy utilization cylinder 5 measured in step 1, $Q_{D2a}$ is a target flow of the throttling speed regulating valve 20, $k_{VC}$ is a proportional constant of a boom 3 target velocity and the pilot pressure of the operating handle, $\zeta$ is an error threshold of the pilot pressure signal of the operating handle;

during the control process, the main pump 25 is in a constant power control mode, after the opening of the throttling speed regulating valve 20 changes, the boom 3 movement speed $v_a$ collected by the speed sensor 26 changes, and the controller controls the change of the output flow of the main pump 25 until the load pressure $P_{pa}$ of the output port of the main pump collected by the fourth pressure sensor 30 reaches the target value, a calculation method of a target value of $P_{pa}$ is as follows:

$$p_{pa} = \begin{cases} \left(1.16 - \dfrac{Q_{pa}}{n_t V_{max}}\right)/0.0195 & 120.9 \le Q_{pa} < 157 \\ \left(1.97 - \dfrac{Q_{pa}}{n_t V_{max}}\right)/0.051 & 157 \le Q_{pa} < 258.8 \\ \left(1 - \dfrac{Q_{pa}}{n_t V_{max}}\right)/0.0019 & 258.8 \le Q_{pa} < 269 \end{cases}$$

where $P_{pa}$ is a load pressure of the output port of the main pump; $V_{max}$ is a rated maximum displacement of main pump 25; $n_t$ is a rotating speed of an engine, $Q_{pa}$ is an oil inlet target flow of the three rodless cavity oil ports, a calculation method for $Q_{pa}$ is as follows:

$$Q_{pa} = k_{VC}(P_{a1} - \zeta)3A_d$$

where $k_{VC}$ is a proportional constant of a boom 3 descending target velocity and a pilot control pressure, $P_{a1}$ is a pilot pressure of the operating handle when the boom 3 moves down, $\zeta$ is the error threshold of the pilot pressure signal of the operating handle, $A_d$ denotes the sum of the rod cavity area of the first energy recovery cylinder 4, the second energy recovery cylinder 6 and the energy utilization cylinder 5.

Figure 4:
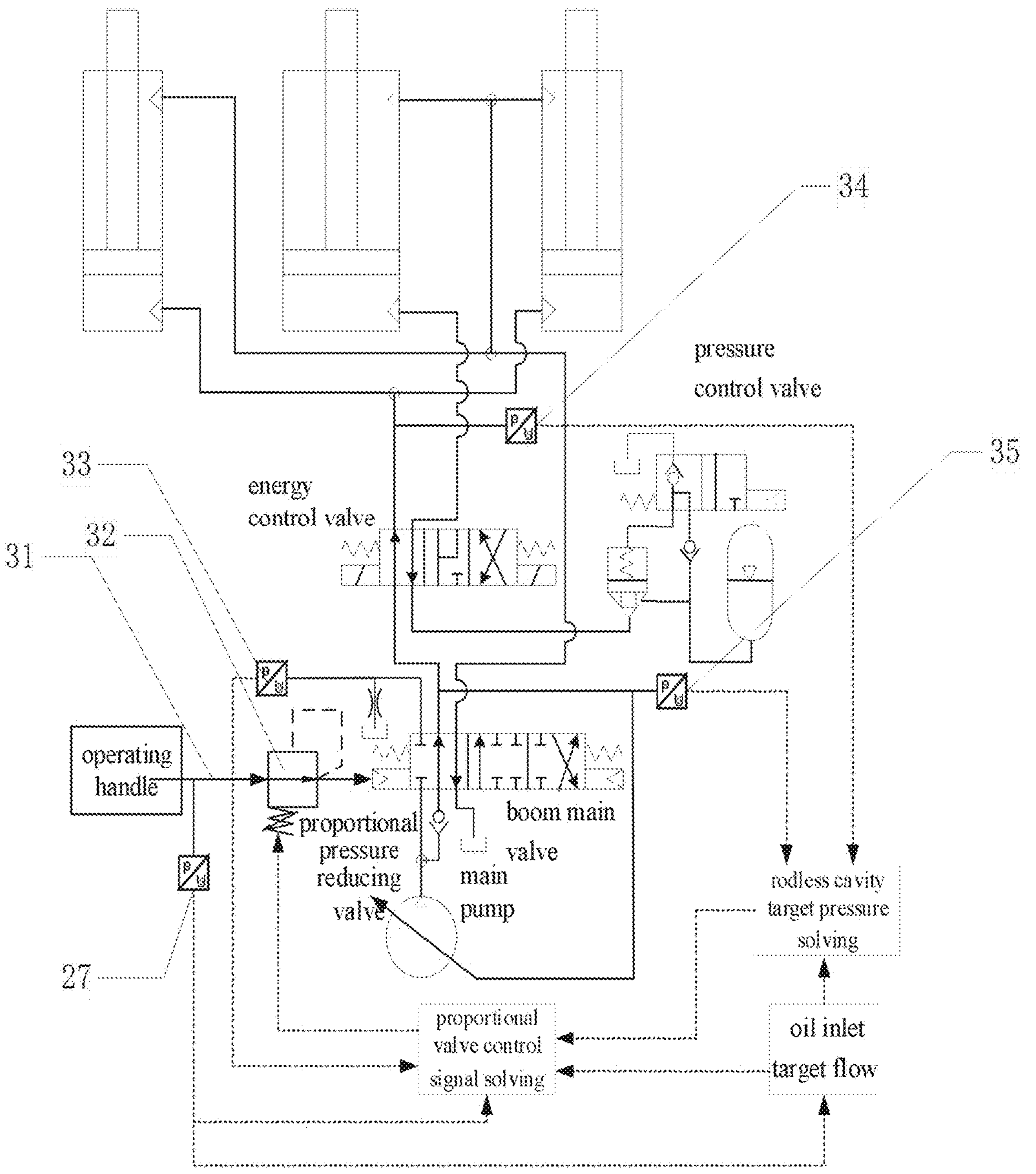
FIG. 4 is a schematic diagram of an embodiment of an energy reuse control strategy based on a flow following in the present invention.

As shown in FIG. 4, the energy recovery control strategy for hydraulic excavator boom 3: when the boom 3 rises, the opening of the proportional pressure reducing valve 32 is changed by the energy reuse control strategy based on flow following, and the control of the rising speed of the boom 3 and the output flow of the main pump 25 is realized, the specific method includes the following steps:

step 1: a target flow of the oil inlet is calculated: a proportional pressure reducing valve 32 is arranged on an oil circuit control 31 between the operating handle and the boom main valve 9, and the proportional pressure reducing valve 32 is connected to the controller, an oil inlet target flow calculation module, a rodless cavity target pressure solving module and a proportional pressure reducing valve control signal solving module are arranged on the controller, the first pressure sensor 27 is used to collect the pilot pressure $P_{b1}$ of the operating handle when the boom 3 rises, and Ph is put into the oil inlet target flow calculation module to obtain an oil inlet target flow $Q_{pb}$, then $Q_{pb}$ is transmitted to the proportional pressure reducing valve control signal solving module, the calculation method of $Q_{pb}$ is as follows:

$$Q_{pb} = K_{VC}(P_{b1} - \zeta)2A_{D1}$$

where $k_{VC}$ is the proportional constant of the boom 3 target velocity and the pilot pressure of the operating handle, $\zeta$ is the error threshold of the pilot pressure signal of the operating handle, $A_{D1}$ denotes the rodless cavity area of the first energy recovery cylinder 4 or the second energy recovery cylinder 6;

step 2: determined whether to adjust the proportional pressure reducing valve: a sixth pressure sensor 34 is used to collect the actual pressure $P_{D1}$ of the rodless cavity of the energy recovery cylinder 10 at the rodless cavity oil pipe of the energy recovery cylinder, a seventh pressure sensor 35 is used to collect the load pressure $P_p$ of the output port of the main pump, $P_{D1}$, $P_p$ and $Q_{pb}$ output by the oil inlet target flow calculation module in step 1 are received through the rodless cavity target pressure solving module, and the following method is used to calculate an oil inlet target flow $P_{D1a}$ of the rodless cavity of the energy recovery cylinder:

$$p_{D1a} = p_p - \frac{Q_{pb}^2}{2(C_{dA}A_x)^2}$$

where $C_{dA}$ is a flow coefficient of the main valve spool of the boom, $A_x$ is an opening area of the main valve spool of the boom under the control of the proportional pressure reducing valve;

compared $P_{D1}$ with $P_{D1a}$, if $P_{D1}$ is equal to $P_{D1a}$, the judgment result is 'do not adjust the proportional pressure reducing valve', if $P_{D1}$ is not equal to $P_{D1a}$, the judgment result is 'adjust the proportional pressure reducing valve', the judgment result is transported to the proportional pressure reducing valve control signal solving module by the oil inlet target flow calculation module;

step 3: a control signal of the proportional pressure reducing valve is solved: when the judgment result received by the proportional pressure reducing valve control signal solving module is 'do not adjust the proportional pressure reducing valve', the proportional pressure reducing valve control signal solving module has no signal output, and does not change the output of the proportional pressure reducing valve 32, so will not lead to a displacement of the spool of the boom main value 9, so as to avoid the increase of the throttling loss of the valve port of the boom main value, the flow of the main pump 25 is output by the system according to a current constant power control mode; when the judgment result received by the proportional pressure reducing valve control signal solving module is 'adjust the proportional pressure reducing valve', the control signal $j_x$ of the proportional pressure reducing valve is solved by the proportional pressure reducing valve control signal solving module uses a received $Q_{pb}$ and a negative flow feedback pressure $p_i$ of the boom main valve detected by a fifth pressure sensor 33, the controller controls the output of the proportional pressure reducing valve to decrease or increase according to $j_x$, when the output of the proportional pressure reducing valve 32 decreases, the displacement of the spool of the boom main value 9 decreases and the flow of the boom main valve 9 increases, resulting in the increase of the negative flow feedback pressure $p_i$ of the boom main valve detected by the fifth pressure sensor 33, when the output of the proportional pressure reducing valve 32 increases, the displacement of the spool of the boom main value 9 increases and the flow of the boom main valve 9 decreases, resulting in the decrease of the negative flow feedback pressure $p_i$ of the boom main valve detected by the fifth pressure sensor 33, the output flow of the main pump 25 is adjusted by the system according to the negative flow feedback pressure of the boom main valve until the output flow of the main pump 25 and the negative flow feedback pressure $p_i$ of the boom main valve form a balance, where a calculation method of $j_x$ is:

$$j_x = f_i^{-1}(Q_{pb})/P_i$$

where, $f_i^{-1}(x)$ is a fitting function of a mapping relationship between the negative flow signal of the main pump 25 and the output flow of the main pump 25.

Therefore, the present invention adopts the energy recovery system and control strategy for the hydraulic excavator boom with the above structure, the inlet and outlet oil can be controlled by two sets of valve spools respectively can be realizing by using the rod cylinder oil inlet and outlet pipe system, the rodless cylinder oil inlet pipe system of energy recovery cylinder, the rodless cylinder oil inlet pipe system of energy utilization cylinder, the rodless cylinder oil return pipe system of energy utilization cylinder and the rodless cylinder oil return pipe system of energy recovery cylinder, and the position of each valve spool can be adjusted according to the system state to realize the control of the boom movement, meanwhile, the back pressure and throttling loss of the return oil are reduced, the energy output of the main pump is reduced, the maneuverability of the whole machine is maintained, and the energy recovery efficiency is improved; the pressure adaptive energy recovery control strategy based on independent inlet and outlet is used to change the opening of the throttling speed regulating valve, so as to realize the control of the descending velocity of the boom and the output flow of the main pump, and effectively reduce the oil inlet throttling loss of the boom main valve; the energy reuse control strategy based on flow following is used to control the opening of the proportional pressure reducing valve, so as to realize the active control of the spool opening of the boom main valve and the negative flow feedback pressure of the boom main valve, so as to change the output flow of the main pump and maintain the maneuverability of the whole machine.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. An energy recovery control strategy for a hydraulic excavator boom, configured for an energy recovery system for a hydraulic excavator boom, wherein the energy recovery system comprises: a first energy recovery cylinder, an energy utilization cylinder, and a second energy recovery cylinder that are sequentially arranged below a boom and connected to the boom, as well as an oil tank and an accumulator; the first energy recovery cylinder, the energy utilization cylinder, and the second energy recovery cylinder are connected to the oil tank and the accumulator through an oil conveying system; the oil conveying system comprises a rod cylinder oil inlet and outlet pipe system, a rodless cylinder oil inlet pipe system of the first energy recovery cylinder and the second energy recovery cylinder, a rodless cylinder oil inlet pipe system of the energy utilization cylinder, a rodless cylinder oil return pipe system of the energy utilization cylinder, and a rodless cylinder oil return pipe system of the first energy recovery cylinder and the second energy recovery cylinder;

wherein the rod cylinder oil inlet and outlet pipe system comprises a rod cavity oil pipe; a first end of the rod cavity oil pipe is connected to the first energy recovery cylinder, the energy utilization cylinder and a rod cavity oil port at a top of the second energy recovery cylinder through three first branches, a second end of the rod cavity oil pipe is connected to a first oil hole enof a boom main valve, a second oil hole enof the boom main valve is connected to an oil outlet hole of the oil tank through a main pump, a third oil hole of the boom main valve is connected to an oil return hole of the oil tank;

wherein the rodless cylinder oil inlet pipe system of the first energy recovery cylinder and the second energy recovery cylinder comprises a rodless cavity oil pipe of the first energy recovery cylinder and the second energy recovery cylinder, and an energy recovery cylinder oil inlet pipe; a first end of the rodless cavity oil pipe of the first energy recovery cylinder and the second energy recovery cylinder is connected to the first energy recovery cylinder and a rodless cavity oil port of the second energy recovery cylinder through two second branches, a second end of the rodless cavity oil pipe of the first energy recovery cylinder and the second energy recovery cylinder is connected to a first oil port on an energy control valve, and a second oil port of the energy control valve is connected to a fourth oil hole of the boom main valve through the energy recovery cylinder oil inlet pipe;

wherein when a right position of the boom main valve is opened, the first oil hole and the second oil hole are connected, the third oil hole and the fourth oil hole are connected, and oil supplied by the main pump promotes the boom to move down; when a left position of the boom main valve is opened, the second oil hole and the fourth oil hole are connected, and the first oil hole and the third oil hole are connected, the oil supplied by the main pump promotes the boom to rise;

wherein the rodless cylinder oil inlet pipe system of the energy utilization cylinder comprises: a rodless cavity oil pipe of the energy utilization cylinder, an energy utilization cylinder oil inlet pipe and an accumulator oil pipe; a first end of the rodless cavity oil pipe of the energy utilization cylinder is connected to a rodless cavity oil port of the energy utilization cylinder, a second end of the rodless cavity oil pipe of the energy utilization cylinder is connected to a third oil port of the energy control valve through the energy utilization cylinder oil inlet pipe, and a fourth oil port of the energy control valve is connected to the accumulator through the accumulator oil pipe;

wherein when a right position of the energy control valve is opened, the first oil port and the fourth oil port on the energy control valve are connected, and the third oil port and the second oil port are not connected; when a left position of the energy control valve is opened, the first oil port and the second oil port on the energy control valve are connected, and the third oil port and the fourth oil port are connected;

wherein the rodless cylinder oil return pipe system of the energy utilization cylinder comprises: a rodless cavity oil pipe of the energy utilization cylinder and an energy utilization cylinder oil return pipe; a first end of the rodless cavity oil pipe of the energy utilization cylinder is connected to a rodless cavity oil port of the energy utilization cylinder, and a second end of the rodless cavity oil pipe of the energy utilization cylinder is connected to the oil tank through the energy utilization cylinder oil return pipe, and the energy utilization cylinder oil return pipe is provided with a throttling speed regulating valve;

wherein the rodless cylinder oil return pipe system of the first energy recovery cylinder and the second energy recovery cylinder comprises: the rodless cavity oil pipe of the first energy recovery cylinder and the second energy recovery cylinder and the accumulator oil pipe;

wherein a first anti-overflow oil pipe with a first anti-overflow valve is arranged between the rod cavity oil pipe and the oil tank, and a second anti-overflow oil pipe with a second anti-overflow valve is arranged between the energy recovery cylinder oil inlet pipe and the oil tank;

and wherein when the boom moves down, the boom main valve keeps a maximum opening degree according to a signal value of a pilot pressure of an operating handle, and changes an opening degree of the throttling speed regulating valve through a pressure adaptive energy recovery control strategy based on a load observation to realize a control of a descending velocity of the boom and an output flow of the main pump, wherein methods comprise the following steps:

step 1: using a sensor to detect a required signal value and sending the required signal value to a controller, wherein the required signal value comprises a boom movement speed $v_a$ collected by using a speed sensor, a pilot pressure $P_{a1}$ of the operating handle when the boom moves down collected by using a first pressure sensor, a target pressure $p_{da}$ of the rod cavity collected by using a second pressure sensor, an actual load pressure $P_{D2}$ of a rodless cavity of the energy utilization cylinder collected by using a third pressure sensor, and a load pressure $P_{pa}$ of an output port of the main pump collected by using a fourth pressure sensor, and the controller comprises a load observer module, a speed regulating valve target pressure solving module and a valve spool opening solving module;

step 2: calculating an equivalent load term $a_L$ by using the load observer module, a calculation method is as follows:

$$\begin{cases} a_L = F_L - F_{acc} \\ F_L = m\dot{v}_a - A_{D2}p_{D2} \\ F_{acc} = 2A_{D1}p_{acc} \end{cases}$$

wherein $a_L$ is the equivalent load term, $F_L$ is an external load, $F_{acc}$ is an accumulator acting force, $A_{D2}$ denotes a rodless cavity area of the energy utilization cylinder, $A_{D1}$ denotes a rodless cavity area of the first energy recovery cylinder or the second energy recovery cylinder, and $p_{acc}$ is a pressure at an accumulator port;

step 3: calculating a target pressure $P_{D2a}$ of the throttling speed regulating valve by using following speed regulating valve target pressure solving module:

$$p_{D2a} = \frac{3A_d p_{da} - m\dot{v}_a - bv_a - ma_L}{A_{D2}}$$

wherein $A_d$ denotes a sum of a rod cavity area of the first energy recovery cylinder, the second energy recovery cylinder and the energy utilization cylinder; $P_{da}$ is a target pressure of the rod cavity measured in step 1; m denotes an equivalent mass of a working device acting on the oil cylinder; $v_a$ is a velocity of the boom movement measured in step 1; $\dot{v}_a$ denotes an accelerated velocity, wherein the accelerated velocity is obtained by differentiating $v_a$; b denotes a viscosity coefficient; $a_L$ is the equivalent load term calculated in step 2; $A_{D2}$ denotes the rodless cavity area of the energy utilization cylinder;

step 4: comparing the target pressure $P_{D2a}$ of the throttling speed regulating valve obtained in step 3 with the actual load pressure $P_{D2}$ of the rodless cavity of the energy utilization cylinder measured in step 1, when $P_{D2a}$ is equal to $P_{D2}$, an opening of the throttling speed regulating valve will not be changed, when $P_{D2a}$ is not equal to $P_{D2}$, carrying out step 5;

step 5: when a pressure difference between $P_{D2a}$ and $P_{D2}$ is positive, reducing the opening of the throttling speed regulating valve, increasing a throttle pressure difference, reducing an output flow of the main pump to reduce a descending velocity of the boom; when the pressure difference between $P_{D2a}$ and $P_{D2}$ is negative, increasing the opening of the throttling speed regulating valve, reducing the throttling pressure difference, increasing the output flow of the main pump to increase a descending velocity of the boom;

in a control process, calculating a valve spool opening area $A_{Dx}$ of flow regulating speed regulating valve according to the following formula:

$$A_{Dx} = \frac{Q_{D2a}}{C_{dD}} / \sqrt{\frac{2p_{D2}}{\rho}}$$

$$Q_{D2a} = k_{VC}(P_{a1} - \zeta)A_{D2}$$

wherein $C_{dD}$ is a flow coefficient of a proportional speed regulating valve spool, p is a density of hydraulic oil, $P_{D2}$ is the actual load pressure of the rodless cavity of the energy utilization cylinder measured in step 1, $Q_{D2a}$ is a target flow of the throttling speed regulating valve, $k_{VC}$ is a proportional constant of a boom target velocity and the pilot pressure of the operating handle, $\zeta$ is an error threshold of a pilot pressure signal of the operating handle;

during a control process, the main pump is in a constant power control mode, after the opening of the throttling speed regulating valve changes, a boom movement velocity $v_a$ collected by the speed sensor changes, and controlling a change of the output flow of the main pump through the controller until the load pressure $P_{pa}$ of the output port of the main pump collected by the fourth pressure sensor reaches a target value, a calculation method of a target value of $P_{pa}$ is as follows:

$$p_{pa} = \begin{cases} \left(1.16 - \frac{Q_{pa}}{n_t V_{max}}\right)/0.0195 & 120.9 \le Q_{pa} < 157 \\ \left(1.97 - \frac{Q_{pa}}{n_t V_{max}}\right)/0.051 & 157 \le Q_{pa} < 258.8 \\ \left(1 - \frac{Q_{pa}}{n_t V_{max}}\right)/0.0019 & 258.8 \le Q_{pa} < 269 \end{cases}$$

wherein $P_{pa}$ is the load pressure of the output port of the main pump; $V_{max}$ is a rated maximum displacement of the main pump; $n_t$ is a rotating speed of an engine, $Q_{pa}$ is an oil inlet target flow of three rodless cavity oil ports, a calculation method for $Q_{pa}$ is as follows:

$$Q_{pa} = k_{VC}(P_{a1} - \zeta)3A_d$$

wherein $k_{VC}$ is a proportional constant of a boom descending target velocity and a pilot control pressure, $P_{a1}$ is a pilot pressure of the operating handle when the boom moves down, $\zeta$ is the error threshold of the pilot pressure signal of the operating handle, $A_d$ denotes the sum of the rod cavity area of the first energy recovery cylinder, the second energy recovery cylinder and the energy utilization cylinder.

2. The energy recovery control strategy according to claim 1, wherein when the boom rises, changing an opening of a proportional pressure reducing valve by an energy reuse control strategy based on flow following, a method comprises the following steps:

step 1: calculating a target flow of the oil inlet: arranging a proportional pressure reducing valve on an oil circuit control between the operating handle and the boom main valve, and connecting the proportional pressure reducing valve to the controller, arranging an oil inlet target flow calculation module, a rodless cavity target pressure solving module and a proportional pressure reducing valve control signal solving module on the controller, using the first pressure sensor to collect the pilot pressure $P_{b1}$ of the operating handle when the boom rises, and inputting $P_{b1}$ into the oil inlet target flow calculation module to obtain an oil inlet target flow $Q_{pb}$, transmitting Q pb to the proportional pressure reducing valve control signal solving module, a calculation method of $Q_{pb}$ is as follows:

$$Q_{pb} = K_{VC}(P_{b1} - \zeta)2A_{D1}$$

wherein $k_{VC}$ is the proportional constant of the boom target velocity and the pilot pressure of the operating handle, $\zeta$ is the error threshold of the pilot pressure signal of the operating handle, $A_{D1}$ denotes the rodless cavity area of the first energy recovery cylinder or the second energy recovery cylinder;

step 2: judging whether to adjust the proportional pressure reducing valve: using a sixth pressure sensor to collect an actual pressure $P_{D1}$ of the rodless cavity of the first energy recovery cylinder and the second energy recovery cylinder at the rodless cavity oil pipe of the first energy recovery cylinder and the second energy recovery cylinder, using a seventh pressure sensor to collect the load pressure $P_p$ of the output port of the main pump, receiving $P_{D1}$, $P_p$ and $Q_{pb}$ output by the oil inlet target flow calculation module in step 1 through the rodless cavity target pressure solving module, and calculating an oil inlet target flow $P_{D1a}$ of the rodless cavity of the first energy recovery cylinder and the second energy recovery cylinder by using following method:

$$p_{D1a} = p_p - \frac{Q_{pb}^2}{2(C_{dA}A_x)^2}$$

wherein $C_{dA}$ is a flow coefficient of a main valve spool of the boom, $A_x$ is an opening area of the main valve spool of the boom under a control of the proportional pressure reducing valve;

comparing $P_{D1}$ with $P_{D1a}$, when $P_{D1}$ is equal to $P_{D1a}$, a judgment result is 'do not adjust the proportional pressure reducing valve', when $P_{D1}$ is not equal to $P_{D1a}$, the judgment result is 'adjust the proportional pressure reducing valve', transporting the judgment result to the proportional pressure reducing valve control signal solving module by the oil inlet target flow calculation module;

step 3: solving a control signal of the proportional pressure reducing valve: when the judgment result received by the proportional pressure reducing valve control signal solving module is ‘do not adjust the proportional pressure reducing valve’, the proportional pressure reducing valve control signal solving module has no signal output, and does not change an output of the proportional pressure reducing valve, so will not lead to a displacement of the spool of a boom main value to avoid the increase of a throttling loss of a valve port of the boom main value, and outputting a flow of the main pump by the system according to a current constant power control mode; when the judgment result received by the proportional pressure reducing valve control signal solving module is ‘adjust the proportional pressure reducing valve’, solving the control signal $j_x$ of the proportional pressure reducing valve by the proportional pressure reducing valve control signal solving module using a received $Q_{pb}$ and a negative flow feedback pressure $p_i$ of the boom main valve detected by a fifth pressure sensor, the controller controls the output of the proportional pressure reducing valve to decrease or increase according to $j_x$, when the output of the proportional pressure reducing valve decreases, the displacement of the spool of the boom main value decreases and the flow of the boom main valve increases, resulting in an increase of the negative flow feedback pressure $p_i$ of the boom main valve detected by the fifth pressure sensor, when the output of the proportional pressure reducing valve increases, the displacement of the spool of the boom main value increases and the flow of the boom main valve decreases, resulting in a decrease of the negative flow feedback pressure $p_i$ of the boom main valve detected by the fifth pressure sensor, and adjusting the output flow of the main pump by the system according to the negative flow feedback pressure $p_i$ of the boom main valve until the output flow of the main pump and the negative flow feedback pressure $p_i$ of the boom main valve form a balance, wherein a calculation method of $j_x$ is:

$$j_x = f_i^{-1}(Q_{pb})/P_i$$

wherein $f_i^{-1}(x)$ is a fitting function of a mapping relationship between a negative flow signal of the main pump and the output flow of the main pump.

* * * * *